US008348739B2

(12) United States Patent
Bell et al.

(10) Patent No.: US 8,348,739 B2
(45) Date of Patent: Jan. 8, 2013

(54) POKER GAME INCLUDING POT EQUITY SHARING AND OPTIONAL WAGER INSURANCE

(76) Inventors: Chris Bell, Raleigh, NC (US); Matt Flynn, Raleigh, NC (US)

( * ) Notice: Subject to any disclaimer, the term of this patent is extended or adjusted under 35 U.S.C. 154(b) by 141 days.

(21) Appl. No.: 13/090,666

(22) Filed: Apr. 20, 2011

(65) Prior Publication Data

US 2012/0270626 A1 Oct. 25, 2012

(51) Int. Cl.
*A63F 9/24* (2006.01)
*A63F 13/00* (2006.01)

(52) U.S. Cl. .............................. 463/13; 463/11; 273/292

(58) Field of Classification Search .............. 463/11–13, 463/16–20, 25, 29; 273/292
See application file for complete search history.

(56) References Cited

U.S. PATENT DOCUMENTS 5,382,025 A * 1/1995 Sklansky et al. .............. 273/292
5,752,702 A * 5/1998 McDoniel ..................... 273/292
6,402,148 B1 6/2002 Saruwatari
7,585,222 B2 9/2009 Muir
7,611,404 B1 * 11/2009 Hilf et al. ........................ 463/13
7,722,047 B2 5/2010 Walker et al.
8,177,618 B1 * 5/2012 Brennan ......................... 463/13
2004/0036217 A1 * 2/2004 Schlumbrecht ............... 273/292
2005/0179206 A1 * 8/2005 Cogert .......................... 273/292
2006/0223605 A1 * 10/2006 Pullman .......................... 463/16
2006/0284376 A1 * 12/2006 Snow ............................ 273/292
2007/0213124 A1 9/2007 Walker et al.
2008/0007004 A1 1/2008 Zahedi
2008/0012222 A1 * 1/2008 Starzec ......................... 273/292
2008/0088087 A1 4/2008 Weitzman et al.
2008/0090632 A1 * 4/2008 Kumar ............................ 463/16
2008/0108412 A1 * 5/2008 Snow et al. ..................... 463/20
2008/0237985 A1 * 10/2008 Cogert et al. ................. 273/292
2009/0121434 A1 5/2009 Baerlocher et al.
2009/0124316 A1 * 5/2009 Baerlocher et al. ............. 463/13
2010/0216532 A1 * 8/2010 Halverson ....................... 463/11
2011/0183737 A1 * 7/2011 Suttle et al. ..................... 463/13

* cited by examiner

*Primary Examiner* — Milap Shah
(74) *Attorney, Agent, or Firm* — Todd L. Juneau

(57) ABSTRACT

This invention relates to various methods for a poker player to limit his losses or protect his potential winnings on a given hand prior to completion of the dealing of cards on such hand, based upon his calculated pot equity, or percentage chance of winning the hand.

12 Claims, 6 Drawing Sheets

1. PRE-FLOP HANDS

PLAYER 1

POT EQUITY: 30.29%

PLAYER 2

POT EQUITY: 18.03%

PLAYER 3

POT EQUITY: 27.65%

PLAYER 4

POT EQUITY: 23.73%

2. EQUITY SHIFT AFTER FLOP

FLOP:

PLAYER 1

POT EQUITY: 15%

PLAYER 2

POT EQUITY: 7.5%

PLAYER 3

POT EQUITY: 72.5%

PLAYER 4

POT EQUITY: 5%

3. EQUITY AFTER THE TURN

TURN:

PLAYER 1

POT EQUITY: 15%

PLAYER 2

POT EQUITY: 7.5%

PLAYER 3

POT EQUITY: 72.5%

PLAYER 4

POT EQUITY: 5%

POKER GAME INCLUDING POT EQUITY SHARING AND OPTIONAL WAGER INSURANCE

CROSS REFERENCE TO RELATED APPLICATIONS

Not applicable.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

The field of the invention is the game of poker, and in particular to methods and devices for playing a poker game involving a combination of insurance and equity splitting.

2. Background of the Invention

Poker is generally considered to be a game where skilled players have a statistical and strategic advantage over lesser skilled players, due in part to certain players' mental ability to calculate their odds of winning a particular hand.

However, in a given poker hand, only one player wins. This all-or-nothing method of awarding pots increases statistical variance. For a given playing bankroll, all-or-nothing awards make it more likely that a player will go broke. For example, a player with superior skill and even a markedly stronger initial hand may nonetheless suffer a "bad beat" despite having played his hand perfectly. A series of such bad beats can break even a superior player with a statistically adequate bankroll. Broke players cannot play, so the all-or-nothing way of awarding pots means that, on average, players play fewer pots and do not last as long as they would with a different way of awarding the pot. This is bad for both the player and the casino. Casinos typically generate revenue from poker games by collecting "rake," usually defined as a fee based on time played or on the size of the pot. Fewer hands played means less revenue generated from casino-operated poker games.

Accordingly, there is a need for methods enabling a poker player to limit losses or protect potential winnings on a given hand prior to awarding the pot in such a hand based upon his calculated percentage chance of winning the hand, which is called pot equity.

The use of wager insurance has also been contemplated in poker and other types of gaming beyond blackjack. For example, U.S. Pat. No. 6,402,148 to Saruwatari discloses an insurance feature in a method for playing a live game between a player and a dealer using a standard deck of playing cards played on a table having a plurality of player positions and involving a community hand.

In another example, US Patent Application 20080088087 to Weitzman discloses wager insurance for a game of No-Limit Texas Hold 'em poker provided to allow players to "hedge their bets" to limit the downside of losing a large bet through the provision of the ability to purchase, from the house, an insurance policy. The premium paid for the insurance policy is calculated by the house taking into account such factors as (a) the amount bet, (b) the strength of the player's hand, and (c) the status of the hand, that is, how far along in the hand the insurance is requested, in terms of how many of the sequence of steps in playing the hand have occurred.

In another example, U.S. Pat. No. 7,585,222 to Muir discloses a gaming device having a game that includes several nearly missed outcomes associated with a designated outcome, where the player is provided an award for achieving a nearly missed outcome. If the player obtains the nearly missed outcome, the award is provided from a near miss insurance pool. Therefore, when a player nearly misses achieving a large jackpot, the gaming device provides the player with insurance payoff. In general, the near miss insurance pool is funded from a portion of each wager, and may be funded by several linked gaming devices.

Existing prior art tends to be limited to live or in-casino networked games, and/or limited to a variation applicable to only a single type of game.

What is needed is an automatic equity calculation function, paired with (i) an option to purchase insurance against loss and/or (ii) an option to split a pot based on equity percentages before a hand's conclusion, to provide poker players with options to reduce statistical variance and protect themselves against bad beats, thereby extending their length of pay and total amounts wagered.

BRIEF SUMMARY OF THE INVENTION

Accordingly, there is provided, in preferred embodiments of the invention, methods and devices that include one or more of the following components:

First, an option to split the pot of a poker hand, based on calculated equity percentages, issued by the house or one of the players or a third party, is offered to all players that have made an "all-in" bet or have called another player's "all-in" bet, once betting has been completed. Each such player will be offered an option to stop the hand and take a payout of the pot, less the rake and possibly a separate fee for equity splitting, multiplied by the player's pot equity percentage, from the house. This equity split option guarantees each player a percentage of the pot regardless of what cards are to come, thereby hedging the risk of total loss. The casino may offer this service for free or charge a fee.

Second, the use of a wager loss insurance option and an equity-splitting option offered to players in tandem. Such an insurance policy is offered to a poker player after the making of a wager. Any player making or calling the bet, regardless of the betting round, will be offered the option to purchase an insurance policy from the house, at an adjustable premium rate proportional to the value of the player's hand and inversely proportional to the player's pot equity percentage. If purchased, the insurance policy guarantees the return of the player's poker wager in the event he should lose the hand, thereby hedging the risk of total loss.

Third, the use of an equity-splitting option offered to players once all betting is completed, if such betting is completed before the final outcome of the hand is determined. Both players (or three or more if three or more are all-in) would have to agree to split the pot based on pot equity instead of running out the remaining card(s). The casino may optionally charge a fee for this service.

In a preferred embodiment, an equity-splitting improvement within a poker gaming method, comprising the steps of (a) calculating each player's pot equity percentage after any round of betting in a poker hand in which (i) all betting on the hand is completed and (ii) all remaining players have either made or called an all-in bet; and (b) offering the option of splitting the pot immediately in amounts proportional to the players' respective pot equity percentages.

In another preferred embodiment, machine accessible medium having associated instructions that, when accessed, results in a machine the following steps: (a) enabling ante or blind wager(s) or both to be placed for said play of the hand; (b) dealing an initial round of player hands, each comprising one or more cards, and optionally dealing one or more community cards; (c) determining each player's pot equity percentage based on a probability of the player hand winning against all other player hands, the probability based on all cards then-outstanding, including any community cards previously dealt, but excluding any folded cards; (d) enabling a round of player betting; (e) enabling an equity splitting protocol initiated when (i) all betting on the hand is completed and (ii) all remaining players have either made or called an all-in bet, which protocol provides each remaining player with a display of his current pot equity percentage, together with an option or a prior agreement to agree to the immediate end of the hand and the payout of the then-existing pot, less the rake and any other fees, to the remaining players based on their respective pot equity percentages; and (f) in the event the equity split offer is accepted by all players remaining in the hand, credit each player's account in the amount of the pot, less the amount of the rake and other fees, multiplied by that player's calculated pot equity percentage, minus any additional fees.

In another preferred embodiment, the machine accessible medium described in paragraph 24, further comprising wherein the equity split option of step (e) is initiated by inviting each player making or calling an all-in bet to participate in the equity splitting by using any known means of communicating with a machine.

In another preferred embodiment, the machine accessible medium described in paragraph 24, further comprising wherein the equity split protocol of step (e) is initiated by (i) preference settings made by players prior to the hand, including, without limitation, whether equity splitting will be offered to the player, in what circumstances equity splitting will be offered, and whether such offers will be accepted automatically by the player, either always or upon a pre-set pot size; or (ii) by player choosing a game or table at which equity splitting is automatically accepted without player input.

In another preferred embodiment, the machine accessible medium described in paragraph 24, further comprising wherein such medium is integrated into a live casino game using shared or individual networked devices, such devices further comprising, any known means of displaying information to the players and allowing the players to communicate with a machine.

In another preferred embodiment, a gaming method, said method comprising: (a) enabling ante or blind wager(s) or both to be placed for said play of the hand; (b) dealing an initial round of player hands, each comprising one or more cards, and optionally dealing one or more community cards; (c) determining each player's pot equity percentage based on the probability of the player hand winning against all other player hands still in the pot, the probability based on all cards then-outstanding, including any community cards previously dealt, but excluding any folded cards; (d) enabling a round of player betting; (e) enabling an equity splitting protocol initiated when (i) all betting on the hand is completed and (ii) all remaining players have either made or called an all-in bet, which protocol provides each player with a display of his current pot equity percentage, together with an option to agree to the immediate end of the hand and the payout of the then-existing pot, less the rake and any other fees, to the remaining players based on their respective pot equity percentages, minus any post-split fees; and (f) in the event the equity split offer is accepted by all players remaining in the hand, crediting each player's account in the amount of the pot, less the amount of the rake and any other fees, multiplied by that player's calculated pot equity percentage minus any additional fees.

In another preferred embodiment, the method described in paragraph 28, which is provided through a data network.

In another preferred embodiment, the method described in paragraph 29, wherein the data network is an internet.

In another preferred embodiment, the method described in paragraph 28, further comprising wherein the optional equity split is initiated by inviting the all-in player to push or click on a radio button, or by using any other known means of communicating with a machine.

In another preferred embodiment, the method described in paragraph 28, further comprising wherein the optional equity split is accepted by the player setting preference settings before the hand is dealt, by using any known means of communicating with a machine.

In a more preferred embodiment, the method described in paragraph 32, further comprising wherein the preference settings include, without limitation, whether equity splitting will be offered to the player, in what circumstances equity splitting will be offered, and whether such offers will be accepted automatically by the player, either always or upon a pre-set pot size.

In another preferred embodiment, the method described in paragraph 28, further comprising wherein such method is integrated into a live casino game using shared or individual networked devices, such devices further comprising, any known means of displaying information to the players and allowing the players to communicate with a machine.

In another preferred embodiment, a combined insurance and equity-splitting improvement within a gaming method, comprising the steps of (a) offering the option of purchasing wager insurance to each player after each round of betting in a poker hand; (b) calculating each player's pot equity percentage at the end of betting for each round of the poker hand; (c) offering the option of purchasing an increased amount of wager insurance at the end of betting wherein the cost of the additional wager insurance is calculated using two factors, the first factor is the proportional amount of a player's total wager within the poker hand and the second factor is the inversely proportional amount of a player's pot equity percentage; and (d) offering the option of splitting the pot immediately in amounts proportional to the players' respective pot equity percentages after any round of betting when (i) all betting on the hand is completed and (ii) all remaining players have either made or called an all-in bet.

In another preferred embodiment, a machine accessible medium having associated instructions, that when accessed, results in a machine the following steps: (a) enabling ante or blind wager(s) or both to be placed for said play of the hand; (b) dealing an initial round of player hands, each comprising one or more cards, and optionally dealing one or more community cards; (c) determining each player's pot equity percentage based on a probability of the player hand winning against all other player hands, the probability based on all cards then-outstanding, including any community cards previously dealt, but excluding any folded cards; (d) enabling a round of player betting; (e) enabling a wager insurance protocol initiated by each completed betting round, which protocol provides each player an option to purchase wager insurance upon a premium, such premium proportional to the size of said player's wager and inversely proportional to said player's pot equity percentage, and to debit the account of any player in accepting such insurance offer in the amount of the calculated premium; (f) enabling an equity splitting protocol initiated when (i) all betting on the hand is completed and (ii) all remaining players have either made or called an all-in bet, which protocol provides each remaining player with a display of his current pot equity percentage, together with an option to agree to the immediate end of the hand and the payout of the then-existing pot, less the rake and any other fees, to the remaining players based on their respective pot equity percentages; (g) in the event the equity split offer is accepted by all players remaining in the hand, crediting each player's account in the amount of the pot, less the amount of the rake and any other fees, multiplied by that player's calculated pot equity percentage, minus any post-splitting fees; (h) in the event no equity split offer is made or accepted and one or more betting rounds remain, repeating steps (c) to (g); (i) determining if the player hand wins against all other player hands for the play of the hand; and (j) credit the player with the amount of the pot, less any rake and any other fees, if the player's hand wins against all other player hands; or if the player hand loses and the player purchased optional wager insurance, credit the player's account with the amount of such player's poker wager.

In another preferred embodiment, the machine accessible medium of paragraph 36, further comprising wherein the premium charged in step (e) is either (i) a flat rate independent of the sizes of the player's wager or the pot, (ii) a standard rate adjustable only in accordance with the player's pot equity percentage, or (iii) a combination of a flat rate and a standard rate adjustable in accordance with the player's pot equity percentage.

In another preferred embodiment, the machine accessible medium of paragraph 36, further comprising wherein each of the wager insurance option of step (e) and the equity split option of step (f) is initiated by inviting each player making or calling an all-in bet by using a known means of communicating with a machine.

In another preferred embodiment, the machine accessible medium of paragraph 36, further comprising wherein the insurance option of step (e) and/or the equity split option of step (f) is made and/or accepted either (i) according to preference settings made by players prior to the hand, including, without limitation, whether insurance and/or equity splitting will be offered to the player, in what circumstances insurance and/or equity splitting will be offered, and whether such offers will be accepted automatically by the player, either always or upon a pre-set pot size; or (ii) by player choosing a game or table at which equity splitting is automatically accepted without player input.

In another preferred embodiment, a gaming method, said method comprising: (a) enabling ante or blind wager(s) or both to be placed for said play of the hand; (b) dealing an initial round of player hands, each comprising one or more cards, and optionally dealing one or more community cards; (c) determining each player's pot equity percentage based on a probability of the player hand winning against all other player hands, the probability based on all cards then-outstanding, including any community cards previously dealt, but excluding any folded cards; (d) enabling a round of player betting; (e) enabling a wager insurance protocol initiated by each completed betting round, which protocol provides each player an option to purchase wager insurance upon a premium, such premium proportional to the size of said player's wager and inversely proportional to said player's pot equity percentage, and to credit the account of any player in accepting such insurance offer in the amount of the calculated premium; (f) enabling an equity splitting protocol initiated by any all-in bet and a call of such all-in bet, which protocol provides each player with a display of his current pot equity percentage, together with an option to agree to the immediate end of the hand and the payout of the then-existing pot, less the rake and any other fees, to the remaining players based on their respective pot equity percentages, minus any post-splitting fees; (g) in the event the equity split offer is accepted by all players remaining in the hand, crediting each player's account in the amount of the pot, less the amount of the rake and any other fees, multiplied by that player's calculated pot equity percentage, minus any post-splitting fees; (h) in the event no equity split offer is made or accepted and one or more betting rounds remain, repeating steps (c) to (g); (i) determining if the player hand wins against all other player hands for the play of the hand; and (j) crediting the player with the amount of the pot, less any rake, if the player's hand wins against all other player hands; or, if the player hand loses and the player purchased optional wager insurance, crediting the player's account with the amount of such player's poker wager.

In another preferred embodiment, the method of paragraph 40, which is provided through a data network.

In another preferred embodiment, the method of paragraph 41, wherein the data network is an internet.

In another preferred embodiment, the method of paragraph 40, further comprising wherein the optional equity split and/or insurance purchase is initiated by inviting the all-in player to push or click on a radio button, or by using any other known means of communicating with a machine.

In another preferred embodiment, the method of paragraph 40, further comprising wherein the optional equity split and/or insurance purchase is accepted by either (i) the player setting preference settings before the hand is dealt, by using any known means of communicating with a machine; or (ii) by player choosing a game or table at which equity splitting is automatically accepted without player input.

In a more preferred embodiment, the method of paragraph 44, further comprising wherein the preference settings include, without limitation, whether equity splitting and/or insurance purchase will be offered to the player, in what circumstances equity splitting and/or insurance purchase will be offered, and whether such offers will be accepted automatically by the player, either always or upon a pre-set pot size.

In another preferred embodiment, the method of paragraph 40, further comprising wherein such method is integrated into a live casino game using shared or individual networked devices, such devices further comprising any known means of displaying information to the players and allowing the players to communicate with a machine.

In another preferred embodiment, the method of paragraph 40, further comprising wherein the option of step (e) and/or step (f) is offered by a third party service provider that is not the casino or house.

DETAILED DESCRIPTION OF THE INVENTION

Figure 1A:
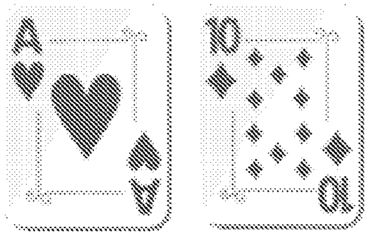
FIGS. 1A, 1B, and 1C are a color illustration of the shifting pot equity percentages of four players during the pre-flop, post-flop, and post-turn rounds of betting during a hand of Texas Hold 'em.
Figure 1A:
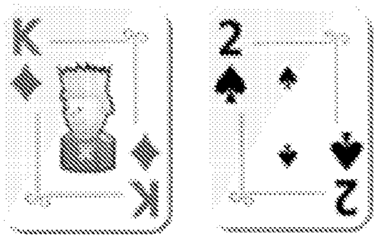
Figure 1A:
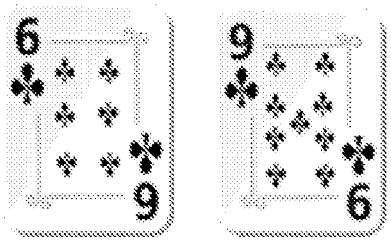
Figure 1A:
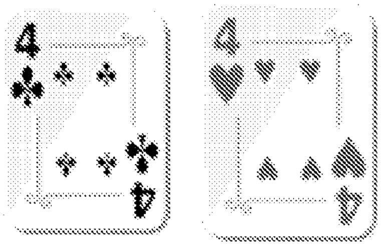

The card game of poker is a well known group of card games, comprising many varieties and generally using a typical 52 card deck made up of four suits of 13 cards each. All variations of the game feature the same basic objective, which is to win the pot, either by obtaining the strongest hand among the players, or by bluffing other players into folding. In a typical deck of playing cards, the four suits are diamonds, hearts, clubs (clovers) and spades. The types of hands that may be obtained while playing some of the most common games of poker, such as Texas Hold'em, Omaha, seven-card stud, five-card stud, and five-card draw, are, from strongest to weakest:

1. Royal Flush: This is the strongest poker hand and consists of the Ace, King, Queen, Jack and 10, all in the same suit. All suits have equal strength and, as such, all Royal Flushes are equal to one another.

2. Straight Flush: five cards of the same suit in sequence, but not including the Ace. When comparing the strength of two Straight Flushes, the one with the higher top card is the stronger Straight Flush. In determining whether one has obtained a Straight Flush, the Ace can be counted as high or low. It is not permitted for a Flush to "turn the corner," i.e., include 4, 3, 2, A, K. The Ace (A) is the lowest possible card in a Straight Flush.

3. Four of a Kind: Four of a Kind consists of four cards of the same rank such as four Jacks, four 3's, etc. When comparing two 4s of a kind, the one with the higher set of 4 cards is higher. In some cases where more than one deck of cards is used in playing the game, two players each may have four of a kind having the same rank. In that case, the hand with the higher fifth card is the stronger hand.

4. Full House: This hand consists of three cards of one rank and two cards of another rank. For example, three 6's and two Jacks. When comparing Full Houses, the rank of the set of three cards determines which is higher. If the sets of three cards are equal, then the hand which has the higher rank of the pairs would be the stronger hand.

5. Flush: A Flush consists of five cards of the same suit without regard to whether they are in numerical order. When comparing two Flushes, the higher card determines which is the stronger hand. If the highest cards are equal, then the second highest cards are compared, etc.

6. Straight: A Straight consists of five cards of mixed suits, but in numerical sequence. When comparing two sequences, the one with the higher ranking top card is the stronger hand. The Ace can count high or low in a Straight, but not both at once.

7. Three of a Kind: Three cards of the same rank plus two other cards. When comparing two Threes of a Kind, the hand in which the three equal cards of higher rank is better. For example, 8 8 8 7 5 beats 7 7 7 4 2. If the sets of three are of equal rank, which can occur when multiple decks are used in playing the game, then the higher of the two remaining cards in each hand is compared and if those are equal, the lower remaining card is compared.

8. Two Pairs: A pair is two cards of equal rank. In a hand with Two Pairs, there are two sets of pairs of different ranks. An additional card makes up a hand of 5 cards. When comparing two separate hands, each of which has Two Pairs, the hand with the highest pair wins irrespective of the rank of the other cards. If the higher pairs are equal, the lower pairs are compared. If both pairs are the same, then the fifth cards are compared.

9. A Pair: A Pair is a hand of two cards of equal rank and three other cards which do not match these or each other. When comparing two such hands, the hand with the higher pair is the stronger hand. If the pairs are equal, then the remaining cards are compared in the manner explained above.

10. High Card: Five cards which do not form any of the combinations set forth above will, of course, have a highest card. When comparing two such hands, the one with the better highest card wins. If the highest cards are equal, then the next highest cards are compared, and so on.

DEFINITIONS

The following definitions are provided as an aid to understanding the detailed description of the present invention.

In poker games, an "All-In Bet" is when a player is faced with a current bet amount that he has insufficient remaining stake to call and he wishes to call (he may of course fold without the need of special rules), he bets the remainder of his stake and declares himself all-in. He may now hold onto his cards for the remainder of the deal as if he had called every bet, but he may not win any more money from any player above the amount of his bet. In no-limit games, a player may also go all-in, that is, betting his entire stack at any point during a betting round. A player who goes all-in effectively caps the main pot, although side pots may be played simultaneously.

The phrase "Bad Beat" means situation in which a large underdog poker hand beats a heavily favored hand.

In poker games, the phrase "Blind" means forced (i.e., mandatory) bets posted by players, usually to the left of the dealer button, in flop-style games. The number of blinds is usually two, but can be one or three. The small blind is placed by the player to the left of the dealer button and the big blind is then posted by the player to the left of the person sitting in the small blind. The one exception to this rule is when there are only 2 players (a "heads up" game). In this case the player on the button is the usually the small blind, and the other player is the big blind.

After the cards are dealt, the player to the left of the big blind is the first to act during the first betting round. If all players call the big blind, the big blind is then given an extra opportunity to raise. This is known as a live blind. If the live blind checks, the betting round then ends. Generally, the "big blind" is equal to the minimum bet. The "small blind" is normally half the big blind but can be another amount less than the big blind or can be equal to the big blind.

The phrase "Community Cards" in certain variations of poker means the use of face-up cards available to all players in combination with all or some of the cards in each player's own personal hand. Examples of games using community cards are Texas Hold 'em and Omaha poker.

In poker games, the phrase "Dealer Button" means a marker used to indicate the player who is dealing or, in casino games with a house dealer, the player who acts last on that deal after the flop (who would be the dealer in a home game). The term button is also used for a variety of plastic discs, or lammers, used by casinos to mark the status of players.

The phrase "Equity" or "Pot Equity" means the amount of a given pot that "belongs" to a given player at a given point during a hand of poker, based on that player's percentage chance of winning the hand.

The word "Flop" is used in games utilizing community cards, such as Texas Hold 'em and Omaha, and means the turn of the initial set of community cards (usually three).

In casino parlance, the word "Rake" means the scaled commission fee taken by a cardroom or casino operating a poker game. It is generally a percentage of the pot in each poker hand, up to a predetermined maximum amount, but not only can this percentage be anything, there are other non-percentage ways for a casino to take the rake.

Poker is a player-versus-player game, and the house does not wager against its players (unlike blackjack or roulette), so rake fees are the principal mechanism for the house to generate revenues. The rake is primarily levied by an establishment that supplies the necessary services for the game to take place, whether the game is live or online. Alternatively, casinos may take a time drop to generate revenue.

The phrase "Side Pot" is used in poker games when any player goes all-in, effectively capping the main pot, meaning that player is not entitled to win any amount from another player over his/her total stake. If only one other player is still in the hand, the other player simply calls the all-in (retracting any overage if necessary) and the hand is dealt to completion. However, if multiple players remain in the game and the bet rises beyond the all-in player's stake, the overage goes into a side pot. Only the players who have contributed to the side pot have the chance to win it. In the case of multiple all-in bets, multiple side pots can be created.

In poker games, the phrase "Table Stakes" means (a) that a player may bet no more money than he had on the table at the beginning of that hand and consequently cannot go back to his pocket for more money once a hand is dealt, and (b) that the effective limit of a bet between any two players is the amount of money in the smaller stack. In between hands, however, a player is free to rebuy or add on so long as his entire stack after the rebuy or addon does not exceed the maximum buy-in. A player also may not take a portion of his money off the table, unless he (or she) leaves the game and takes his entire stack out of play. Table stakes is the rule in most cash poker games because it allows players with vastly different bankrolls a reasonable amount of protection when playing with one another.

An example of table stakes is as follows: one player has a $100 stack and another player has a $200 stack. The maximum bet between the two players is $100 each. The player with $200 cannot force his opponent to bet more than his $100 on the table at the beginning of the hand, nor can the player with $100 voluntarily add to his stack during the hand.

Popular variations of poker include, without limitation, Five or Seven Card Draw, Five or Seven Card Stud, Seven Card Stud Hilo, Razz, High or Low Chicago, Oxford Stud, Omaha, Omaha Hi-Lo, Pineapple, Hold 'em, Badugi, Badeuci, Deuce-to-Seven Lowball Triple Draw, and Kansas City Lowball. There are many other poker variations.

Given the many varieties of poker, it is not surprising that certain games do not adhere to the standard system of ranking hands. For example, in Badugi the "royal flush" is A234 all different suits. In Deuce-to-Seven Lowball Triple Draw, the "royal flush" is 23457 without a flush. And many games are hilo split such that these rankings would only apply to the high hands. The ideas disclosed herein rely on a casino's ability to compute a player's percentage chance of winning a hand, and thus would apply to any such game, regardless of the specific hand ranking system employed.

Certain poker games use only the hands dealt directly to players. Among these are Five Card Draw and Seven Card Stud. Other variations use "community cards", meaning that each player is dealt his own hand, and some or all of the player's cards are used in combination with community cards to create the best possible hand. Examples of community card games are Hold 'em and Omaha.

Of the poker variations mentioned above, Texas Hold 'em is one of the more popular versions. Texas Hold 'em is a multi-player card game played at a live card table or via a computer-based virtual card table. In one version of a live card table game of Texas Hold 'em, two players at a table make the initial bets, commonly referred to as the blinds. These blinds include a big blind and a small blind, where the large blind is typically twice the value of the small blind but can be the same size or another ratio. In a blind based game such as Texas Hold 'em, all players are initially eligible to receive a hand, even if they did not place the large blind or the small blind. After the blind bets are made, each player eligible for play is dealt an initial set of cards. Each of the players must match the blinds, raise the blinds or fold. Texas Hold 'em includes a designated number of community cards (usually five) that can be used by all of the players in combination with their hole cards. However, in certain variations, there may be a different number of community cards. In certain Texas Hold 'em games, the community cards are dealt over the course of several wagering rounds. For example, the gaming device or dealer deals the flop (usually three cards), the turn (usually one card), and the river (usually one card). The winning hand is the resulting five card hand (of the combined seven cards, including the two player cards) having the highest poker rank. This method of determining a winning five card hand is similar to determining a winning hand in Seven Card Stud. However, Seven Card Stud does not utilize community cards as in Texas Hold 'em.

Poker has become increasingly popular during the last decade, largely due to an increased presence in sports television programming. Specifically, coverage of the World Series of Poker® and other poker tournaments has made large television audiences familiar with a range of "celebrity" professional poker players, as well as the rules of poker. The game of Texas Hold 'em has become especially well-known from television.

One aspect of the television coverage of most poker tournaments is the presence on the screen during betting of the "pot equity" of the players in a given hand. For example, during ESPN's coverage of the World Series of Poker®, each player will have his or her name, his or her two cards and the corresponding equity percentage posted at the bottom of the screen. With the flop, the turn of each successive community card, and as other players fold, the equity percentages of active players update for the viewing audience to see.

An example of pot equity percentages in a given hand of Texas Hold 'em is as follows. Four players are dealt the following hands of two cards each: Player One receives an Ace of Hearts and a Ten of Diamonds; Player Two receives a King of Diamonds and a Two of Spades; Player Three Receives a Six of Clubs and a Nine of Clubs; and Player Four receives a Four of Hearts and a Four of Clubs (a "pocket pair"). Based on these hands prior to the flop, the equity percentages of the four players would be: Player One 30.36%, Player Two 18.10%, Player Three 27.73% and Player Four 23.80%.

Continuing the example, the flop yields a Nine of Hearts, a Five of Diamonds and a Three of Spades. Based on the community cards contained in the flop, and assuming no players fold, the equity percentages of the four players shift to: Player One 20.12%, Player Two 12.44%, Player Three 57.32% and Player Four 10.12%.

Continuing the example, the turn card yields an Eight of Hearts. Including the turn card, and assuming no players fold, the equity percentages of the four players shift to: Player One 15%, Player Two 7.5%, Player Three 72.5% and Player Four 5%.

Continuing the example, in the round of betting following the turn, Player Three holds a strong advantage over all other players, but each other player has at least one "out", and remains capable of winning the hand on the river.

Another feature of poker that has become familiar to a large audience due to television is the concept of an "all-in" bet. In a no-limit game, any player may decide to go all-in, wagering all of his chips, during any betting round of a hand. This player remains in the hand until its conclusion as if he has called every bet, but his winnings are limited to the total amount of his all-in bet and all calls thereof. Any amounts wagered by other players in excess of the all-in bet are placed in a side pot.

All-in pots may also occur in limit games where the betting on each wager is fixed to a certain amount or limited by a spread of wager sizes (such as $1-$5 spread-limit seven card stud), or in pot-limit where the betting on each wager is limited by the size of the pot after any call.

Poker is generally considered to be a game where skilled players have a statistical and strategic advantage over lesser skilled players. For example, skilled players are typically better than less skilled opponents at figuring out what range of hands an opponent likely has, and choosing betting patterns to make it harder for opponents to figure out their range of hands. In live games, a skilled player is often able to discern visual clues or "tells" from their opponents that give them certain information about their opponents' hands. Also, a skilled player may know or be able to calculate the odds of winning a particular hand or the odds of receiving one or more cards that would be required to win. If the skilled player can do any of these things better than opponents, they have a distinct advantage over a non-skilled player or a player with lesser skills. Accordingly, certain non-skilled players may be reluctant to play poker against opponents who are highly skilled. Additionally, certain skilled players may seek out a game of poker with non-skilled players to gain an advantage.

Of course, in a given poker hand, only one player wins. This makes the game more exciting, and presumably more enticing and fun, because the worst starting hand can still win the pot depending on how the cards fall. The down side for seasoned players, however, is that superior skill and even a markedly stronger initial hand may fail to carry the day due to bad luck, resulting in a "bad beat" for the loser. Bad beats are extremely costly for the losing player and often decide the outcome of tournaments.

For example, an experienced player in a Texas Hold 'em tournament may recognize that he holds an overwhelming statistical advantage over his sole remaining opponent after the turn, or fourth community card, is dealt, when only one card in the entire deck could possibly result in victory for the opponent. If the pot were already sizable, the experienced player might choose to make an all-in bet at this point to drive the opponent out and end the hand early.

Were the opponent equally experienced, he would recognize the futility of his position and fold. However, a less skilled opponent, not realizing his poor situation, might choose to stay in the hand, matching the all in bet and triggering the dealing of the "river", or fifth community card. If the opponent were to then draw the one winning card available to him, he would be rewarded for his comparative inexperience with a large pot. Meanwhile, the more experienced and knowledgeable player would be busted or at least seriously damaged, despite having played the hand perfectly. Such are the vagaries of poker.

Wager or loss insurance has been utilized in both live and online or computerized gaming. Commonly, internet casino websites offer insurance on blackjack bets.

In practice, an often-used form of blackjack insurance bet is a separate bet that a dealer has a blackjack. When the dealer shows an ace, each player may make a side bet of half the amount of his regular bet, which bet typically pays 2-to-1 in the event that the dealer has a blackjack. Such a bet might also be characterized as payment of an insurance premium. A player that wins his insurance bet will also lose his regular bet to the dealer's blackjack. Thus, in that round, the player breaks even, less the insurance premium payment.

In offering insurance, a computer-based gaming device would first have its insurance-related protocol triggered by a player action, usually the completion of a round of betting prior to the dealing of the next card(s). Upon initiation of the protocol, the gaming device would calculate the pot equity of a player's hand, then offer the player the chance to purchase wager insurance at an adjustable amount proportional to the size of the player's poker wager and inversely proportional to the player's pot equity percentage.

An alternative or complementary option for a casino to offer to poker players would be an "equity splitting" option. This feature would offer an all-in player, upon making or calling an all-in wager, the option to protect his wager against bad beats by agreeing with other players remaining in the hand to immediately split the pot, with each player taking a portion of the pot based on his then-current pot equity percentage. Thus, the concept of equity splitting provides the benefits of insurance by removing the possibility of a bad beat, while also entitling the player to retain a set percentage of the pot.

Equity splitting is different from insurance. With insurance, a player is offered an insurance contract that is effectively a wager. In the blackjack insurance example, the player makes a wager against the house having a blackjack. The house (or a third party) takes the wager. Critically, the outcome of this wager is still determined by chance. This is in contrast to an equity split, where no wager is taken, and the outcome is not determined by chance. Rather, the element of chance is removed. For example, in a poker equity split, the remaining cards or community card(s) do not need to be dealt to determine the outcome. Remaining cards can still be dealt, but they—the element of chance—become meaningless.

In offering equity splitting, a computer-based gaming device would first have its equity splitting protocol triggered by a player action, usually the making and calling of an all-in bet. Upon initiation of the protocol, the gaming device would calculate the pot equity of each player's hand, then offer each player the option to agree to the immediate end of the hand and the payout of the then-existing pot, less the rake and any separate fee for the equity split, to the remaining players based on their respective pot equity percentages.

The use of adjustable payouts based on computer-generated pot equity calculations in poker bets is known in the art. For example, U.S. Patent Application No. 20090121434 to Baerlocher discloses a gaming device that includes a poker game where two cards are dealt face-up to at least one player and to a dealer. The gaming device enables the player to place an optional wager based on the initially dealt two card hand. A pay out for the optional wager is determined based on the probability that the final player hand will outrank the final dealer hand. The pay out is inversely proportional to the probability that the player will win.

The main source of revenue for a casino poker room is the rake. Since the volume of rake fees flowing to the house is related to the number of hands played and the size of the pots won, it is in the interest of the house to keep the maximum number of players possible active in the game and to extend each game for the maximum number of hands possible.

Some casinos, instead of a rake, charge a poker seat fee, sometimes called a "time drop". Each time a new dealer arrives at a table, the dealer will collect the time drop fee. The time drop has been argued to be more lucrative for casinos, but is often less popular with players than the rake. The use of a time drop toll may raise a losing player's level of dissatisfaction and increases the chance that he will walk away. In contrast, the rake is technically charged only against winning players, who are much less likely to mind or even notice the charge during the moment of victory. It is for this reason that more casinos employ the rake.

Each poker player that busts or has their stake damaged to the point that they withdraw from a game will decrease number of players participating. Thus, having a player bust tends to decrease both the size and number of pots being wagered. Any such decrease has a direct adverse effect on the rake revenues or time charges generated for a casino by its poker operation.

The proffer of insurance or equity splitting options offers economic benefits to casinos. Most obviously, the potential exists for the house to charge a fee, either flat or percentage-based, for the right to purchase insurance or to make an equity split. In a game such as blackjack in which the house participates, this fee is gathered in addition to house winnings.

The offering of fee-based wager or loss insurance or equity splitting by the house in the poker setting would provide the casino with a second revenue stream in addition to the rake. Players would voluntarily pay a small fee to eliminate the possibility of a bad beat and reduce statistical variance by insuring the pot or splitting the pot by equity.

Indirectly, the offering of insurance or equity splitting in poker would also benefit a casino's rake by decreasing statistical variance for players, including eliminating bad beats, and therefore providing increased opportunity and incentive for players to gamble longer. However, unlike insurance, the option of an equity split creates no financial risk for the house. Thus, a casino may have a financial incentive to offer an equity split, even if the casino did not charge a fee for the service.

In a preferred embodiment, in a computerized or internet poker gaming system wherein, at a betting interval, a gaming device protocol would generate for the player a pot equity calculation, determining a pot equity percentage based on the probability of the player's hand winning, enabling an optional insurance premium to be placed that is associated with said displayed pot equity percentage and determining if said optional wager has been placed, by the clicking of a radio button or by selecting a prior setting to accept such offers in certain circumstances such as "always" or "when I am the favorite" or otherwise indicating acceptance, or by sitting at a live or virtual table where such offers are always accepted under specified circumstances, such as "when an all-in pot occurs." The amount of the insurance premium, if any, would be automatically calculated by the gaming device based on an adjustable amount proportional to the size of the player's poker wager and inversely proportional to the pot equity percentage. The offered insurance premium amount is then displayed to the player concurrently with the offer, and upon acceptance, the player's account is immediately debited in the amount of the insurance premium. In the event a player making an insurance wager wins the hand, the device will credit the player's account in the amount of the pot, less the amount of the rake. In the event the player making an insurance wager loses the hand, the device will credit the player's account in the amount of the player's poker bet on the hand. In this embodiment, if the player is not yet all-in, the player is not shown his own pot equity percentage together with the insurance purchase option, as this would inform him of his pot equity in the hand before all betting is completed.

In another preferred embodiment, the player would purchase insurance to guarantee that percentage of the pot proportional to his own calculated pot equity percentage.

In another preferred embodiment, the player would pay an adjusted premium amount to guarantee payment of the full amount of the pot.

In a more preferred embodiment, any such insurance wager option would present only after the player makes or calls an all-in bet. In such embodiment, the player would be shown his own pot equity calculation together with the insurance option and premium amount.

In another preferred embodiment, a computerized or internet poker system wherein, at a betting interval, a gaming device protocol would generate for the player a pot equity calculation, determining a pot equity percentage based on the probability of the player hand winning, offering all players the option, exercisable by clicking a radio button or prior setting to accept such offers in certain circumstances, to immediately end the hand and split the pot among the remaining players according to each player's pot equity percentage. In the event the equity split offer is accepted by all players remaining in the hand, the device will credit each player's account an amount equal to the sum of the amount of the pot, less the amount of the rake and any fee for such splitting, multiplied by that player's calculated pot equity percentage.

In a more preferred embodiment, the gaming device would only have its equity splitting protocol triggered upon one player making an all-in bet and at least one other player calling such all-in bet. In such embodiment, the player would be shown his own pot equity percentage together with the equity splitting option and any fee.

In a more preferred embodiment, the gaming device would only have its equity splitting protocol triggered upon the completion of all possible wagering where every player is all-in save for the one player, if applicable, whose stack is bigger than all the other stacks of players remaining in the hand.

In another preferred embodiment, the features of the described gaming system wherein the system is integrated into live casino gaming via shared or individual networked devices. In such embodiment, the devices could take the form of a large display screen visible to all players at a table, with each player having access to individual response controls allowing, for example, the player to accept or decline offers of insurance or equity splitting.

In a more preferred embodiment, each player would have an individual display screen visible only to himself, for example a standard computer screen attached to or built into the table, a handheld screen, a screen embedded in eyeglasses, or similar device, paired with individual response controls allowing, for example, the player to accept or decline offers of insurance or equity splitting.

In another preferred embodiment, the player operating or interacting with the gaming system would indicate preferences or answer prompts by using a computer mouse or any other commonly available means of communicating with a machine, such as shaking, turning or twisting a phone or game console remote control, making a hand gesture or other body gesture registered by a sensor, either on the body or located off the body, pushing an arrow key or hot key or any key on a physical keyboard or a graphical representation of a keyboard, tapping a lever or switch, turning a knob or any similar means of allowing a computer to determine the answer to the offer.

In another preferred embodiment, the gaming system would initiate the protocol for offering insurance and/or an equity split according to preferences set by the player prior to the hand or the game, such preferences to include, without limitation, whether such option will be offered to the player, in what circumstances the option will be offered, and whether such offers will be accepted automatically on the player's behalf, or on an ad hoc basis. Such embodiment may further comprise the pre-set preference automatic acceptance of all insurance and/or an equity split options upon the pot reaching a certain size, whether measured by dollar amount or as a percentage of a pot size limit set for a given game.

The methods described above may advantageously be implemented using a computer-based approach, and the present invention therefore includes a computer system for practicing the methods. A computer system comprises a number of internal components and is also linked to external components. The internal components include processor element interconnected with main memory. The external components include mass storage, e.g., one or more hard disks (typically of 1 GB or greater storage capacity). Additional external components include user interface device, which can be a keyboard and a monitor including a display screen, together with pointing device, such as a "mouse", or other graphic input device. The interface allows the user to interact with the computer system, e.g., to cause the execution of particular application programs, to enter inputs such as data and instructions, to receive output, etc. The computer system may further include disk drive, CD drive, and/or other external drive for reading and/or writing information from or to external media respectively. Additional components such as DVD drives, USB ports, cloud storage on the internet, etc., are also contemplated.

The computer system is typically connected to one or more network lines or connections, which can be part of an Ethernet, wireless, cellular, direct cable, or similar link to other local computer systems, remote computer systems, or wide area communication networks, such as the Internet. This network link allows the computer system to share data and processing tasks with other computer systems and to communicate with remotely located users. The computer system may also include components such as a display screen, printer, etc., for presenting information, e.g., for displaying graphical representations of gene networks.

A variety of software components, which are typically stored on mass storage, will generally be loaded into memory during operation of the inventive system. These components function in concert to implement the methods described herein. The software components include operating system, which manages the operation of computer system and its network connections. This operating system can be, e.g., a Microsoft Windows® operating system such as Windows Vista® or Windows 7®, a Macintosh operating system such as Leopard® or Snow Leopard®, a Unix or Linux operating system, an OS/2 or MS/DOS operating system, etc.

The software component is intended to embody various languages and functions present on the system to enable execution of application programs that implement the inventive methods. Such components include, for example, language-specific compilers, interpreters, and the like. Any of a wide variety of programming languages may be used to code the methods of the invention. Such languages include, but are not limited to, C (see, for example, Press et al., 1993, Numerical Recipes in C: The Art of Scientific Computing, Cambridge Univ. Press, Cambridge, or the Web site having URL www.nr.com for implementations of various matrix operations in C), C++, Fortran, JAVA.™., various languages suitable for development of rule-based expert systems such as are well known in the field of artificial intelligence, etc. According to certain embodiments of the invention the software components include a Web browser, for interacting with the World Wide Web.

The software component represents the methods of the present invention as embodied in a programming language of choice. In particular, the software component includes code to accept a set of activity measurements and code to estimate parameters of an approximation to a set of equations and steps representing a poker gaming system. Included within the latter is code to implement one or more fitness functions. Code to calculate variances and other statistical metrics, as described above, may also be included. Additional software components to display the network model may also be included. According to certain embodiments of the invention a user is allowed to select various among different options for fitness function, statistical measures and significance, etc. The user may also select various criteria and threshold values for use in identifying major regulators of particular species and/or of the network as a whole. The invention may also include one or more databases that contain sets of parameters for a plurality of different models, statistical package, and other software components such as sequence analysis software, etc.

Thus the invention provides a computer system for constructing a poker gaming system, the computer system comprising: (i) memory that stores a program comprising computer-executable process steps; and (ii) a processor which executes the process steps so as to construct a model of a poker gaming system, the model comprising an approximation to a set of programmed process steps that represent the steps of dealing and betting and paying out of a gaming system. According to certain embodiments of the invention the process steps estimate parameters of and select a structure for a model of a specific variety of poker. The process steps may perform any of the inventive methods described herein. According to certain aspects of the invention rather than constructing the model, the computer system receives externally supplied instructions regarding dealing, checking, betting, folding, purchasing wager insurance, and pot equity splitting (e.g., activity data), as entered by a user. The computer system uses the model, data and externally supplied instructions to accept wagers and determine the winner(s) and amounts paid out for each hand of poker.

The invention further provides computer-executable process steps stored on a computer-readable medium, the computer-executable process steps comprising code to perform the methods herein. According to certain embodiments of the invention the computer-executable process steps comprise code to estimate parameters of and select a structure for a model of a poker gaming system. The code may implement any of the inventive methods described herein. The model may be displayed or presented to the user in any of a variety of ways. For example, the parameters may be displayed in tables, as matrices, as weights on a graphical representation of the network, etc.

The foregoing description is to be understood as being representative only and is not intended to be limiting. Alternative systems and techniques for implementing the methods of the invention will be apparent to one of skill in the art and are intended to be included within the accompanying claims. In particular, the accompanying claims are intended to include alternative program structures for implementing the methods of this invention that will be readily apparent to one of skill in the art.

Figure 1B:
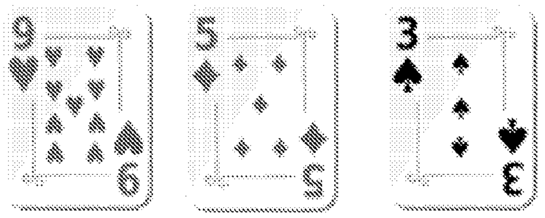
Figure 1B:
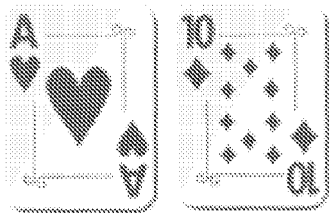
Figure 1B:
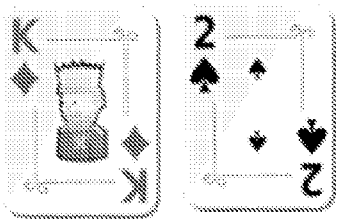
Figure 1B:
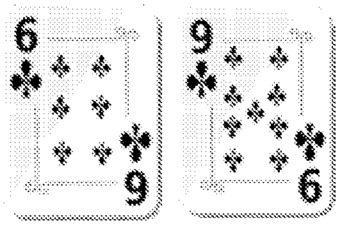
Figure 1B:
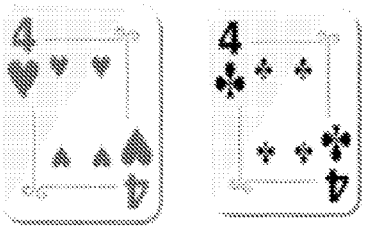
Figure 1C:
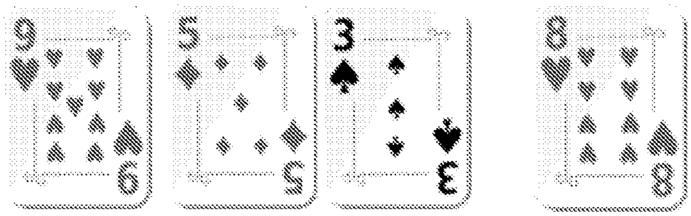
Figure 1C:
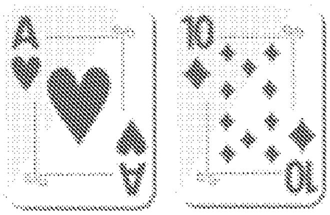
Figure 1C:
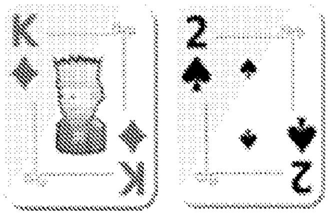
Figure 1C:
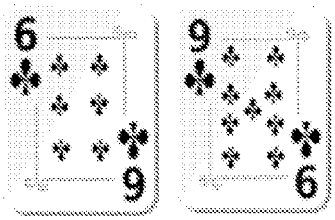
Figure 1C:
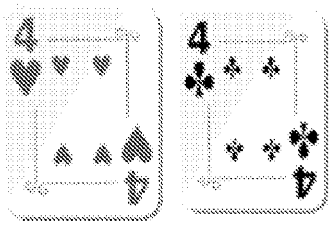

Referring now to the figures, FIGS. 1A, 1B, and 1C show a color illustration of the shifting pot equity percentages of four players during the pre-flop, post-flop, and post-turn rounds of betting during a hand of Texas Hold 'em. The evolution of the hand illustrates the shift in relative strength of the players' hands as new community cards are dealt. For example, the hand of Player 1 begins in a position of relative strength pre-flop with a percentage of 30.36%, but that strength decreases to 15% after four community cards are dealt. In contrast, Player 3's 27.73% pre-flop equity strengthens markedly with the turn of four community cards, resulting in a 72.5% chance of victory going into the final round of dealing and betting. Still, it should be noted that even Player 4, with the weakest hand, nonetheless holds a 5% chance of securing the entire pot, and inflicting a bad beat on the remaining players, were he to call all bets and stay in the hand.

Figure 2:
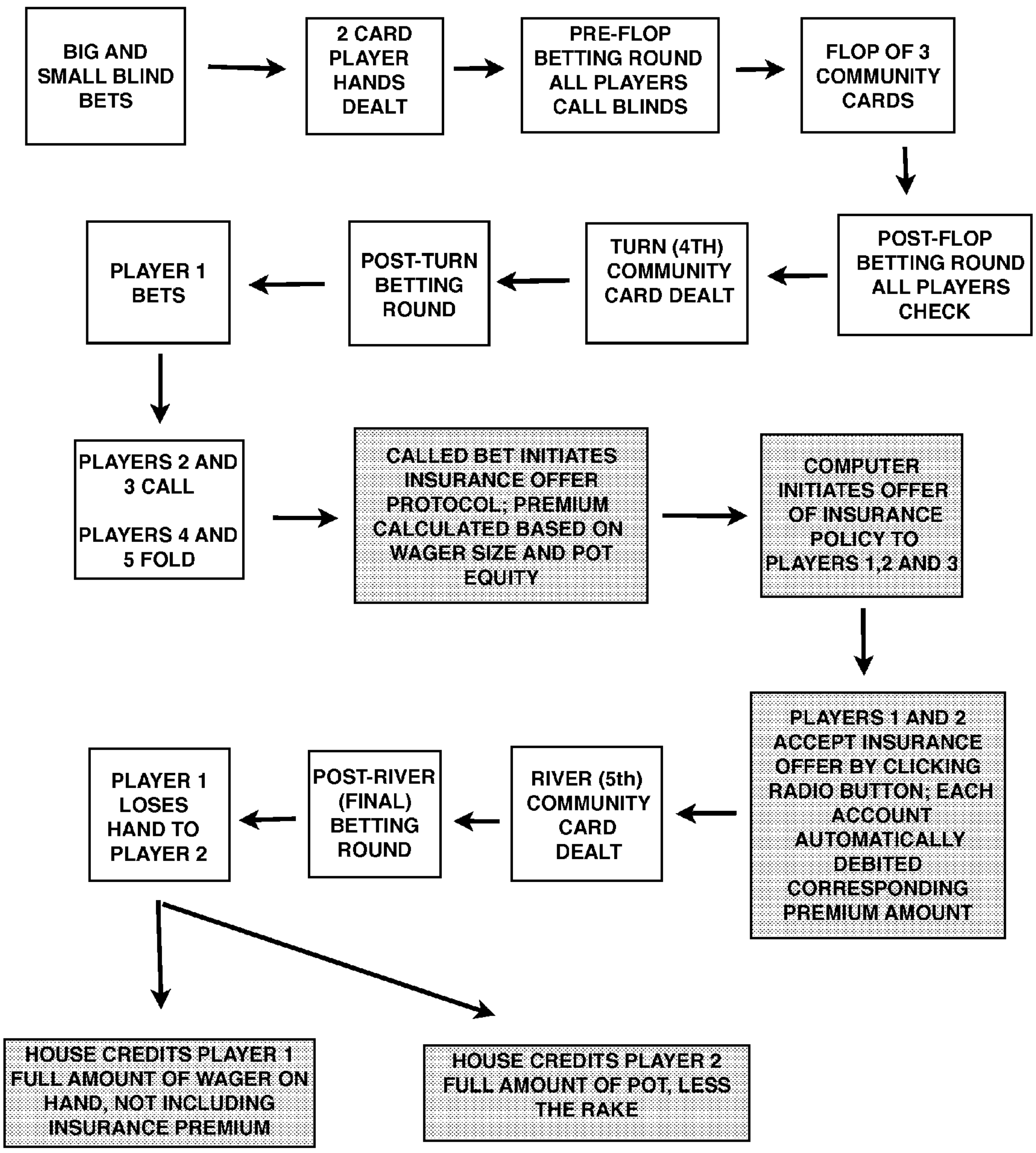
FIG. 2 is a flow chart illustrating the ordered steps of an internet-based hand of Texas Hold 'em, including use of a wager insurance option.

Referring now to FIG. 2, a flow chart illustrating the ordered steps of an internet-based hand of Texas Hold 'em. In the example, one player makes a bet following the dealing of the fourth community, or "turn" card, and two other players call the bet. In this example, the calling of a bet triggers the wager insurance protocol of the gaming system described herein, resulting in the gaming system offering each remaining player wager insurance at a premium based on the size of his wager and his pot equity. In the example, Players 1 and 2 accept the offer and the payment of the associated insurance premium.

Figure 3:
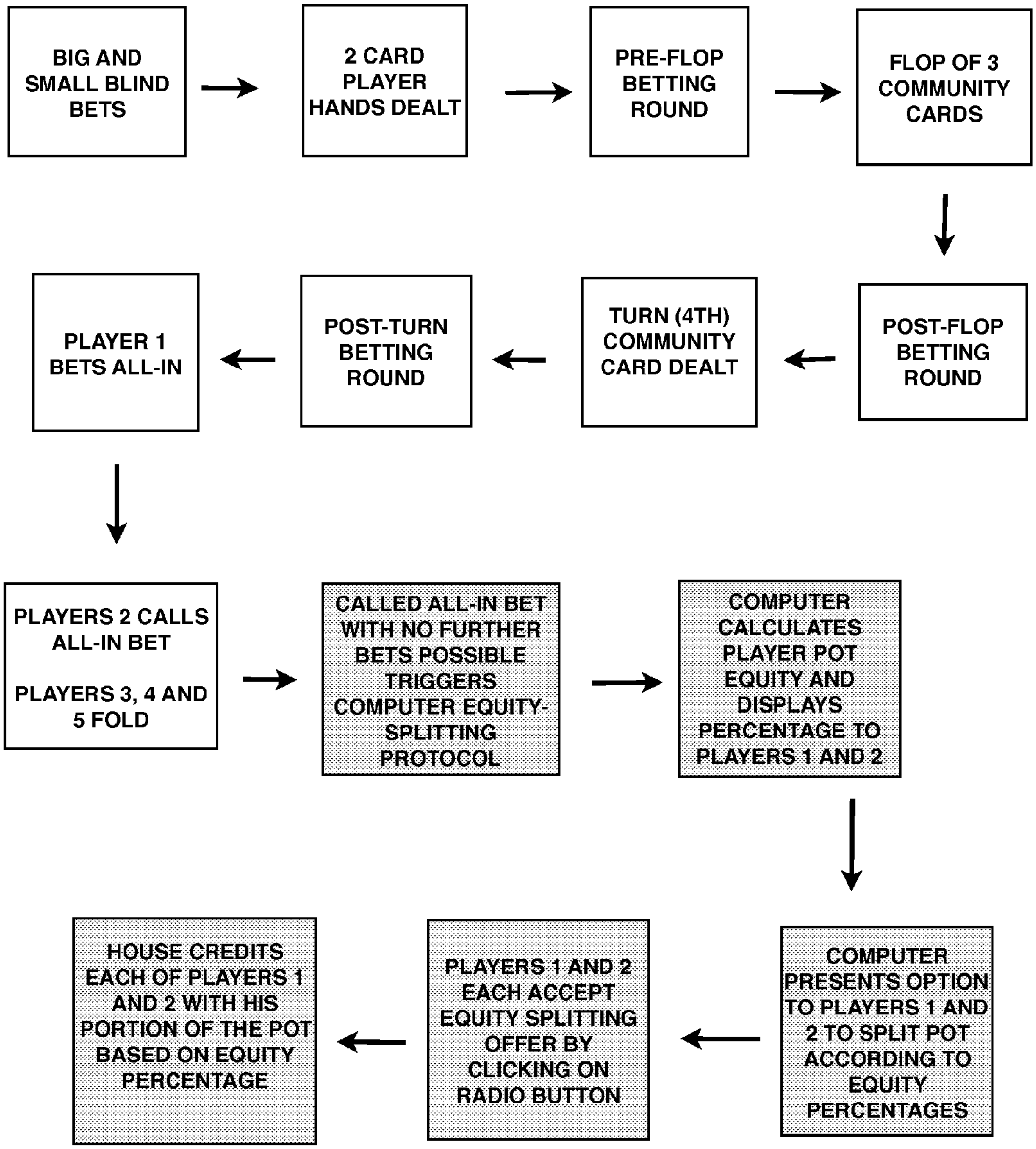
FIG. 3 is a flow chart illustrating the ordered steps of an internet-based hand of Texas Hold 'em, including use of an equity splitting option.

Referring now to FIG. 3, a flow chart illustrating the ordered steps of an internet-based hand of Texas Hold 'em. In the example, one player makes an all-in bet following the dealing of the fourth community, or "Turn" card, and one other player calls the all-in bet. In this example, the calling of an all-in bet with no further bets possible during a betting round triggers the equity-splitting protocol of the gaming system described herein, resulting in the gaming system showing each remaining player his pot equity percentage, accompanied by an offer to split the pot with the other remaining players based on such percentage. If each player accepts such offer, as occurs in the illustrated example, the hand immediately terminates and each remaining player's account is credited with that player's percentage of the pot. In this example, no fee is charged to the players by the house for the equity splitting function.

Figure 4:
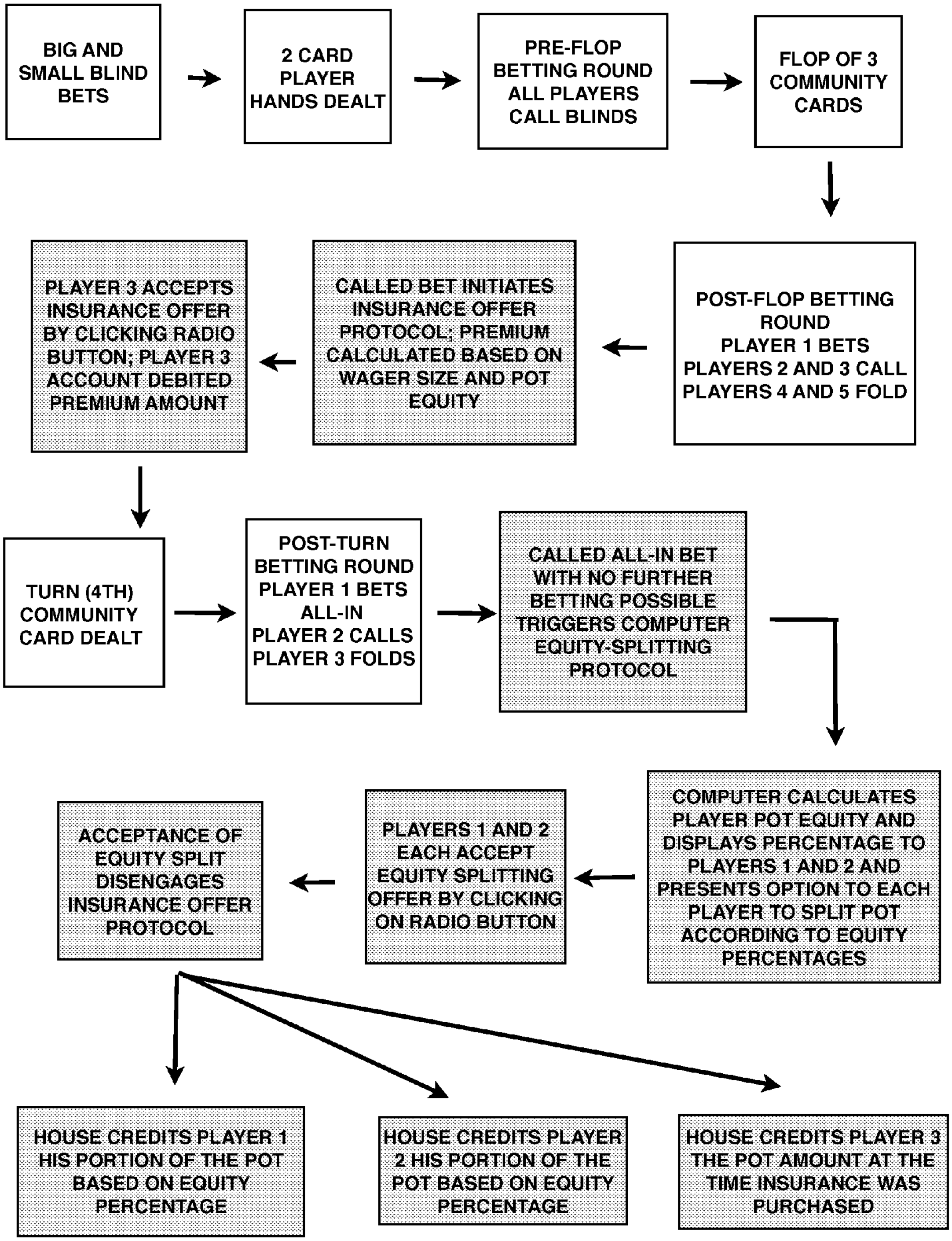
FIG. 4 is a flow chart illustrating the ordered steps of an internet-based hand of Texas Hold 'em, including use of both a wager insurance option and an equity splitting option.

Referring now to FIG. 4, a flow chart illustrating the ordered steps of an internet-based hand of Texas Hold 'em. In the example, all players call the big blind in the pre-flop betting round. Player 1 then makes a bet after the flop and Players 2 and 3 call the bet. The completion of a betting round triggers the gaming device's wager insurance protocol, and each player is then offered insurance by the gaming device. Only Player 3 accepts the insurance and pays the premium. Player 1 bets all-in after the dealing of the fourth community, or "Turn" card, Players 2 calls again and Player 3 folds. The calling of an all-in bet with no further bets possible triggers the equity-splitting protocol of the gaming system described herein, resulting in the gaming system showing each remaining player his pot equity percentage, accompanied by an offer to split the pot with the other remaining players based on such percentage. If each player accepts such offer, as occurs in the illustrated example, the hand immediately terminates and each remaining player's account is credited with that player's percentage of the pot. The acceptance of the equity-splitting option by all players prevents the insurance protocol from making a third offer of insurance to remaining players. In this example, no fee is charged to the players by the house for the equity splitting function. The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. A gaming method for combined insurance and equity-splitting improvement within an electronic poker game operated by one or more processors, the method comprising the one or more processors performing the steps of:

(a) dealing a starting hand of one or more cards to each of a plurality of players participating in a hand of poker of the poker game;

(b) conducting a plurality of rounds of betting for the poker hand, wherein one or more players remain in the poker hand after each of round of betting;

(c) after each round of betting, offering remaining players the option of purchasing wager insurance in the poker hand;

(d) calculating each remaining player's pot equity percentage at the end of each round of betting of the poker hand;

(e) offering remaining players the option of purchasing an increased amount of wager insurance at the end of each round of betting, wherein the cost of the additional wager insurance is calculated using two factors, the two factors including a first factor that is the proportional amount of a remaining player's total wager within the poker hand at the time of calculating the cost and a second factor is the inversely proportional amount of a remaining player's pot equity percentage at the time of calculating the cost; and (f) offering remaining players the option of splitting a pot comprising of any bets placed by the plurality of players during one or more of the rounds of betting, immediately in amounts proportional to each remaining player's respective pot equity percentage at the end of any round of betting when (i) all betting on the poker hand is completed and (ii) all remaining players have either made or called an all-in bet.

2. A non-transitory computer readable medium, having instructions stored thereon, which when executed by a processor, causes the processor to perform the following steps:

(a) enabling one or more of ante or blind wagers to be placed for play of a poker hand;

(b) dealing an initial round of player hands to a plurality of players participating in the poker hand, each comprising one or more cards, and optionally dealing one or more community cards;

(c) determining each player's pot equity percentage based on a probability of the respective player hand winning against all other player hands, the probability based on all cards then-outstanding, including any community cards previously dealt, but excluding any cards of all other player hands;

(d) enabling one or more rounds of betting for the poker hand, wherein one or more players remain in the poker hand after each of round of betting;

(e) enabling an optional wager insurance protocol initiated by each completed betting round, which protocol provides each remaining player an option to purchase wager insurance upon a premium, such premium proportional to the size of each respective player's wager and inversely proportional to each respective player's pot equity percentage, wherein an account of any player accepting such insurance offer is debited in the amount of the calculated premium;

(f) enabling an equity splitting protocol initiated when (i) all betting on the poker hand is completed and (ii) all remaining players have either made or called an all-in bet, which protocol provides each remaining player with a display of his current pot equity percentage, together with an option to agree to the immediate end of the hand and payout of the then-existing pot, less a rake and any other fees, to the remaining players based on their respective pot equity percentages, wherein the then-existing post comprises of any bets placed by the plurality of players during one or more of the rounds of betting;

(g) in the event the equity split offer is accepted by all players remaining in the hand, crediting each player's account in the amount of the then-existing pot, less an amount of the rake and said any other fees, multiplied by that player's calculated pot equity percentage, minus any post-splitting fees, and ending the poker hand;

(h) in the event no equity split offer is made or accepted and one or more betting rounds remain, repeating steps (c) to (g);

(i) when no more betting rounds remain, determining which player hand of the remaining players wins against all other player hands of the remaining players for the play of the poker hand;

(j) crediting the remaining player with the winning player hand with the amount of a final pot, less the amount of the rake and said any other fees; and (k) crediting any remaining players with player hands that have lost to a winning player hand, an amount of the respective player's wager(s) for the poker hand the player purchased the optional wager insurance.

3. The non-transitory computer readable medium of claim 2, further comprising wherein each of the optional wager insurance protocol of step (e) and the equity splitting protocol of step (f) is initiated by inviting each remaining player making or calling an all-in bet by using a means of communicating with a machine.

4. The non-transitory computer readable medium of claim 2, further comprising wherein the optional wager insurance protocol of step (e) and/or the equity splitting protocol of step (f) is made and/or accepted either (i) according to preference settings made by players prior to the poker hand, including, without limitation, whether insurance and/or equity splitting will be offered to the player, in what circumstances insurance and/or equity splitting will be offered, and whether such offers will be accepted automatically by the player, either always or upon a pre-set pot size; or (ii) by player choosing a poker game or table at which equity splitting is automatically accepted without player input.

5. A gaming method for an electronic poker game operated by one or more processors, said method comprising the one or more processors performing the steps of:

(a) enabling one or more of ante or blind wagers to be placed for play of a poker hand;

(b) dealing an initial round of player hands to a plurality of players participating in the poker hand, each comprising one or more cards, and optionally dealing one or more community cards;

(c) determining each player's pot equity percentage based on a probability of the respective player hand winning against all other player hands, the probability based on all cards then-outstanding, including any community cards previously dealt, but excluding any cards of all other player hands;

(d) enabling one or more rounds of betting for the poker hand, wherein one or more players remain in the poker hand after each of round of betting;

(e) enabling an optional wager insurance protocol initiated by each completed betting round, which protocol provides each remaining player an option to purchase wager insurance upon a premium, such premium proportional to the size of each respective player's wager and inversely proportional to each respective player's pot equity percentage, wherein an account of any player accepting such insurance offer is debited in the amount of the calculated premium;

(f) enabling an equity splitting protocol initiated when (i) all betting on the poker hand is completed and (ii) all remaining players have either made or called an all-in bet, which protocol provides each remaining player with a display of his current pot equity percentage, together with an option to agree to the immediate end of the hand and payout of the then-existing pot, less a rake and any other fees, to the remaining players based on their respective pot equity percentages, wherein the then-existing post comprises of any bets placed by the plurality of players during one or more of the rounds of betting;

(g) in the event the equity split offer is accepted by all players remaining in the hand, crediting each player's account in the amount of the then-existing pot, less an amount of the rake and said any other fees, multiplied by that player's calculated pot equity percentage, minus any post-splitting fees, and ending the poker hand;

(h) in the event no equity split offer is made or accepted and one or more betting rounds remain, repeating steps (c) to (g);

(i) when no more betting rounds remain, determining which player hand of the remaining players wins against all other player hands of the remaining players for the play of the poker hand;

(j) crediting the remaining player with the winning player hand with the amount of a final pot, less the amount of the rake and said any other fees; and (k) crediting any remaining players with player hands that have lost to a winning player hand, an amount of the respective player's wager(s) for the poker hand the player purchased the optional wager insurance.

6. The method of claim 5, which is provided through a data network.

7. The method of claim 6, wherein the data network is an Internet.

8. The method of claim 5, further comprising wherein the each of the equity splitting protocol and/or the optional wager insurance protocol purchased is initiated by inviting a remaining player to push or click on a radio button, or by using any other means of communicating with a machine.

9. The method of claim 5, further comprising wherein each of the equity splitting protocol and/or the optional wager insurance protocol purchased is accepted by either (i) the player setting preference settings before the hand is dealt, by using any means of communicating with a machine; or (ii) by player choosing a poker game or table at which equity splitting is automatically accepted without player input.

10. The method of claim 9, further comprising wherein the preference settings include, whether equity splitting and/or optional wager insurance purchase will be offered to the player, in what circumstances equity splitting and/or optional wager insurance purchase will be offered, and whether such offers will be accepted automatically by the player, either always or upon a pre-set pot size.

11. The method of claim 5, further comprising the method being integrated into a live casino game using shared or individual networked devices, such devices further comprising any means of displaying information to the players and allowing the players to communicate with a machine.

12. The method of claim 5, further comprising wherein the optional wager insurance protocol and/or the equity splitting protocol is offered by a third party service provider that is not a casino or house.

* * * * *